March 13, 1973   W. G. BUNCHAK ET AL   3,720,278
MINE HAULAGE VEHICLE

Filed June 18, 1970   3 Sheets-Sheet 1

INVENTORS
William G. Bunchak
Reynold J. Krizek

March 13, 1973  W. G. BUNCHAK ET AL  3,720,278
MINE HAULAGE VEHICLE

Filed June 18, 1970  3 Sheets-Sheet 3

INVENTORS
William G. Bunchak
Reynold J. Krizek

United States Patent Office 3,720,278
Patented Mar. 13, 1973

3,720,278
MINE HAULAGE VEHICLE
William G. Bunchak, Chicago Ridge, and Reynold J. Krizek, Oak Forest, Ill., assignors to Westinghouse Air Brake Company, Pittsburgh, Pa.
Filed June 18, 1970, Ser. No. 47,354
Int. Cl. B60r 7/00, 17/30
U.S. Cl. 180—24         5 Claims

ABSTRACT OF THE DISCLOSURE

A self-powered mine haulage vehicle having a body which is articulated generally at its midpoint and having a pair of supporting wheels at each end of the body and intermediately located supporting wheels at the midpoint. The end supporting wheels are motorized wheel units with steering and braking means therefor.

REFERENCE TO RELATED APPLICATION

This invention is an improvement in the haulage vehicle of the type shown in Pat. No. 3,302,739 issued Feb. 7, 1967 to William R. Beck et al. and entitled "Shuttle Cars with Six Driven Wheels."

BACKGROUND OF THE INVENTION

The six-wheel type of haulage vehicle, commonly called a shuttle car, consists of an elongated body which is articulated at or near its midpoint so the car can maintain traction on uneven surfaces. The body comprises two pivotably joined body sections forming a load carrying trough which is generally open at each end. Material which is loaded into the trough or carrying chamber is discharged therefrom at one end by an endless flight conveyor which moves over a load supporting surface on the bottom of the trough. Three pairs of wheels support the articulated body, one pair at each end and one pair at or near the point of articulation.

Shuttle cars are designed to carry maximum loads consistent with the size limitations imposed on the cars by the mine passageways. The overall width and length of a shuttle car is based on its ability to negotiate sharp curves and tight places underground. Further, four wheel steering is essential to provide the maneuverability needed with a shuttle car of maximum dimensions. With the prior 6-wheel shuttle car designs it was believed the ideal arrangement included a pair of motorized steerable wheel units at each end of the car body and a pair of non-steerable motorized wheel units at the mid pivot joint which were provided with braking means. The brake means being disposed between the motor and the adjacent body section.

Since each end wheel unit was mounted on the car body by means of a carrier providing for load equalizing and steering movements of the wheel units the incorporation of a braking means in the end wheel units appeared to be impossible without greatly narrowing the shuttle car carrying compartment throughout its length. Because the carrying compartment can be no wider than its narrowest dimension, excessive space requirements by the wheel unit would result in a loss of carrying capacity much greater than just the space required to accommodate the wheel units. The wheel units are positioned at the maximum outward spacing consistent with the overall width of the car body and cannot be moved outwardly without increasing the overall width of the car. Further, clearances must be provided between the carrying compartment sidewall and each wheel unit in its maximum turned position so that related steering linkage can function.

With brake means provided only on the center wheels a limited braking force is available to stop the shuttle cars, which may prove to be inadequate when operating on pitches and grades.

SUMMARY OF THE INVENTION

A primary object of this invention is to provide a 6-wheel shuttle car having a maximum material carrying chamber for a given overall body width, with improved brake means capable of safely stopping the shuttle car, even under the most adverse operating conditions. Shuttle cars of this types are characterized in that a pair of steerable wheels are associated with each end portion of the car body in load supporting relationship, and a pair of intermediate wheels associated with the body intermediate the pairs of end wheels.

The end wheels comprise motorized wheel units each driven by an individual motor. Each motor has a motor frame supporting its associated wheel for load equalizing and steering movements relative to the car body. The improved brake means comprises a brake disc mounted on and rotatable with a motor shaft extending from each motor and a brake cylinder for each brake disc arranged to make frictional engagement with the brake disc when the cylinder is actuated to lock the wheels against rotation. The brake cylinders are conveniently mounted on steering arms provided with each steerable wheel.

The brake means is positioned between the motor and the sidewall of a corresponding body section. Equalizer means is provided for the steerable end wheels. The motor frame is connected to the body and equalizer means by a universal means whereby load is transmitted from an associated body section to the wheel through the equalizer means, universal means, and motor frame so that the wheel, motor and brake means may be freely movable relative to the corresponding body section to provide adequate steering and load equalization movement of the wheels within a limited space available in a shuttle car having a limited overall width and having a maximum material carrying chamber.

The intermediate non-steerable wheels may also be motorized wheel units, each driven by an individual motor, and provided with brake means similar to that of the end pairs of wheels. In some instances, however, only four motorized wheel units may be required for tractive power. In these circumstances the intermediate wheels will be non-drivable and non-brakeable. In any event, all motorized wheel units will be controlled by a brake, providing a considerable increase in braking force for stopping a shuttle car as compared with past braking means which were applicable only to the intermediate pair of wheels.

THE DRAWINGS

Figure 1:
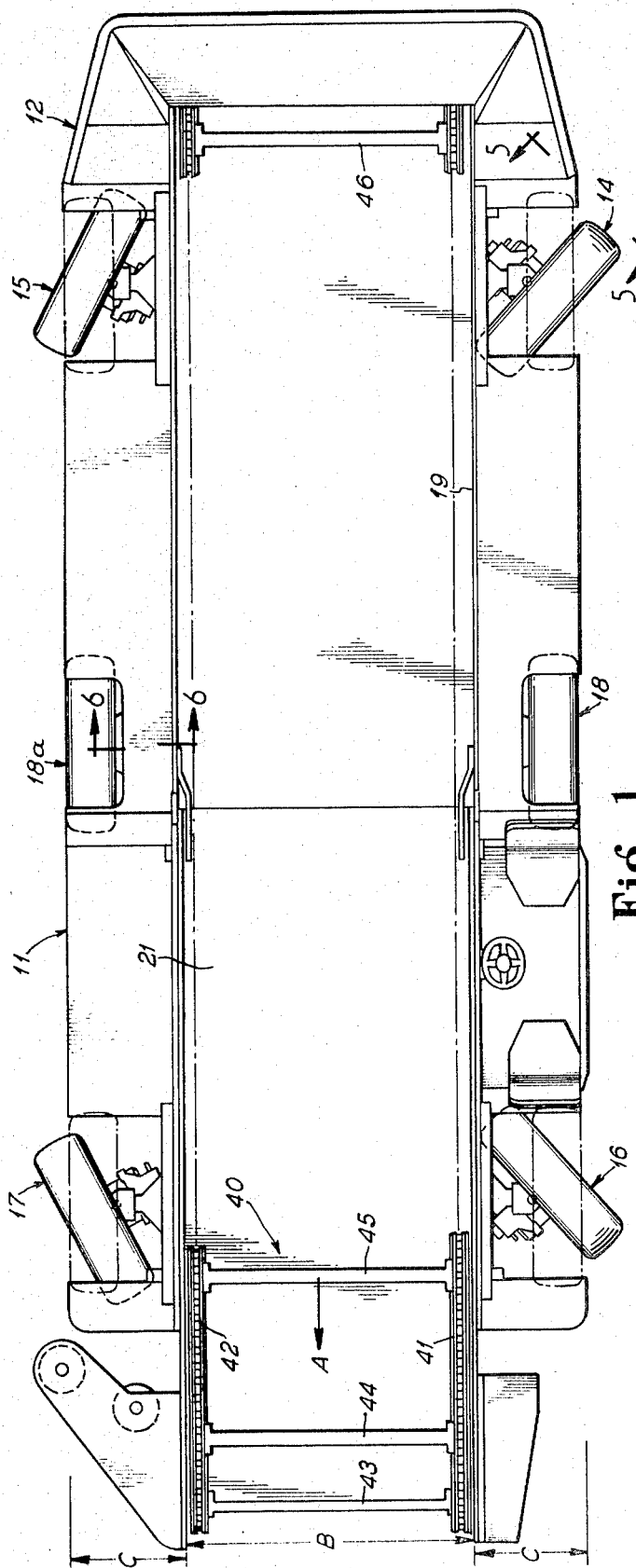
FIG. 1 is a top plan view of a vehicle embodying the invention.
Figure 2:
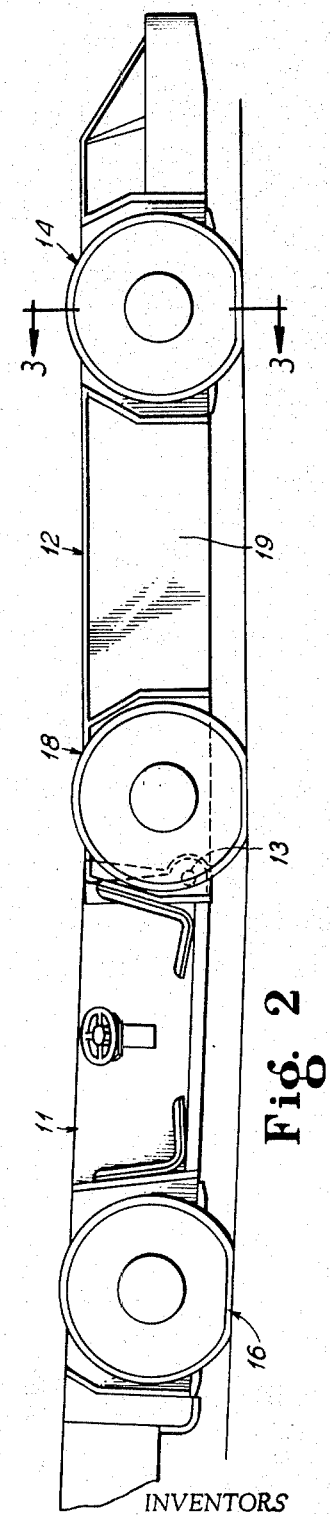
FIG. 2 is a side elevational view of the FIG. 1 vehicle.

This invention is an improvement on the invention shown and described in U.S. Pat. 3,302,739 issued to W. R. Beck et al. on Feb. 7, 1967. The instant drawings are to a great extent similar or identical with the drawings in said issued patent. Also, the mode of operation of component parts is the same in the two disclosures; to avoid repetition as much as possible the instant drawings use similar reference numerals for parts common to both disclosures.

GENERAL FUNCTION AND DIMENSIONS

FIG. 1 looks down on a mine haulage vehicle or shuttle car used particularly in coal mines to transport broken-out coal from the cutting face to a remote handling station. The coal may be cut by a continuous miner having a conveyor that discharges the coal directly into the illustrated vehicle, or a separate loading conveyor may be provided to deliver the cut coal from a pile into the illustrated vehicle. The vehicle is self-powered, self-steered, and self-braked so that it can be moved back and forth btween the coal cutting point and remote conveying station. Commonly, the vehicle is built to carry about nine tons of coal. The vehicle itself may have a weight of approximately 25,000 pounds, a length of about 27 feet, and a width of about 9 feet. The vehicle is driven by self-contained electric motors powering each wheel individually. The vehicle attains a top speed of about five miles per hour.

As shown in FIG. 1, the vehicle is equipped with steerable wheels 14 and 15 at its front loading end, a pair of central non-steerable wheels 18 and 18a, and a pair of steerable wheels 16 and 17 at its rear discharge end. This is an articulated trough-like vehicle comprising a front body section 12 and a rear body section 11, said sections being pivotally connected together on a transverse pivot axis 13 in the same fashion as shown generally in FIGS. 6 through 8 of aforementioned Pat. 3,302,739.

Figure 3:
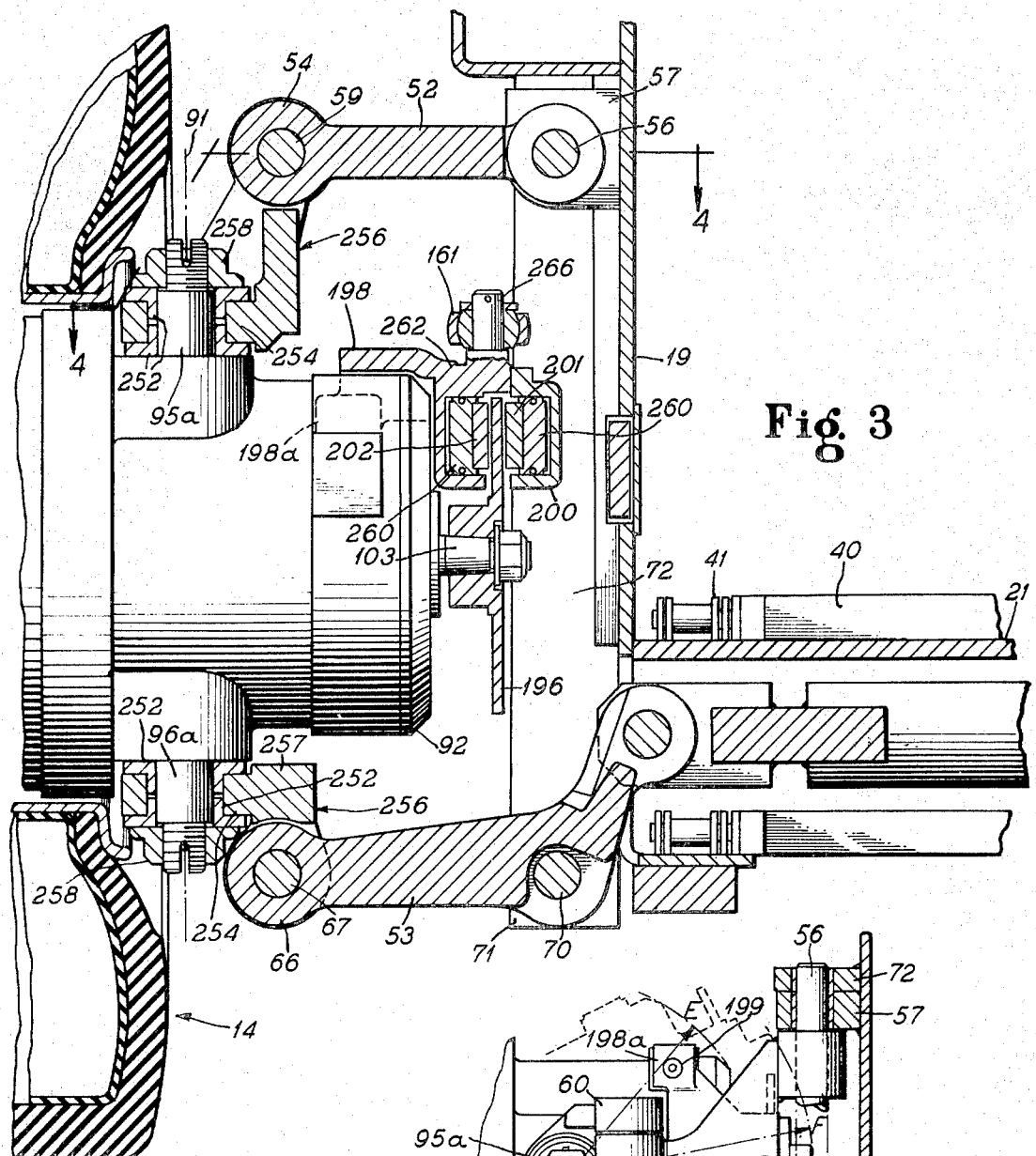
FIG. 3 is an enlarged sectional view on line 3—3 in FIG. 2.
Figure 5:
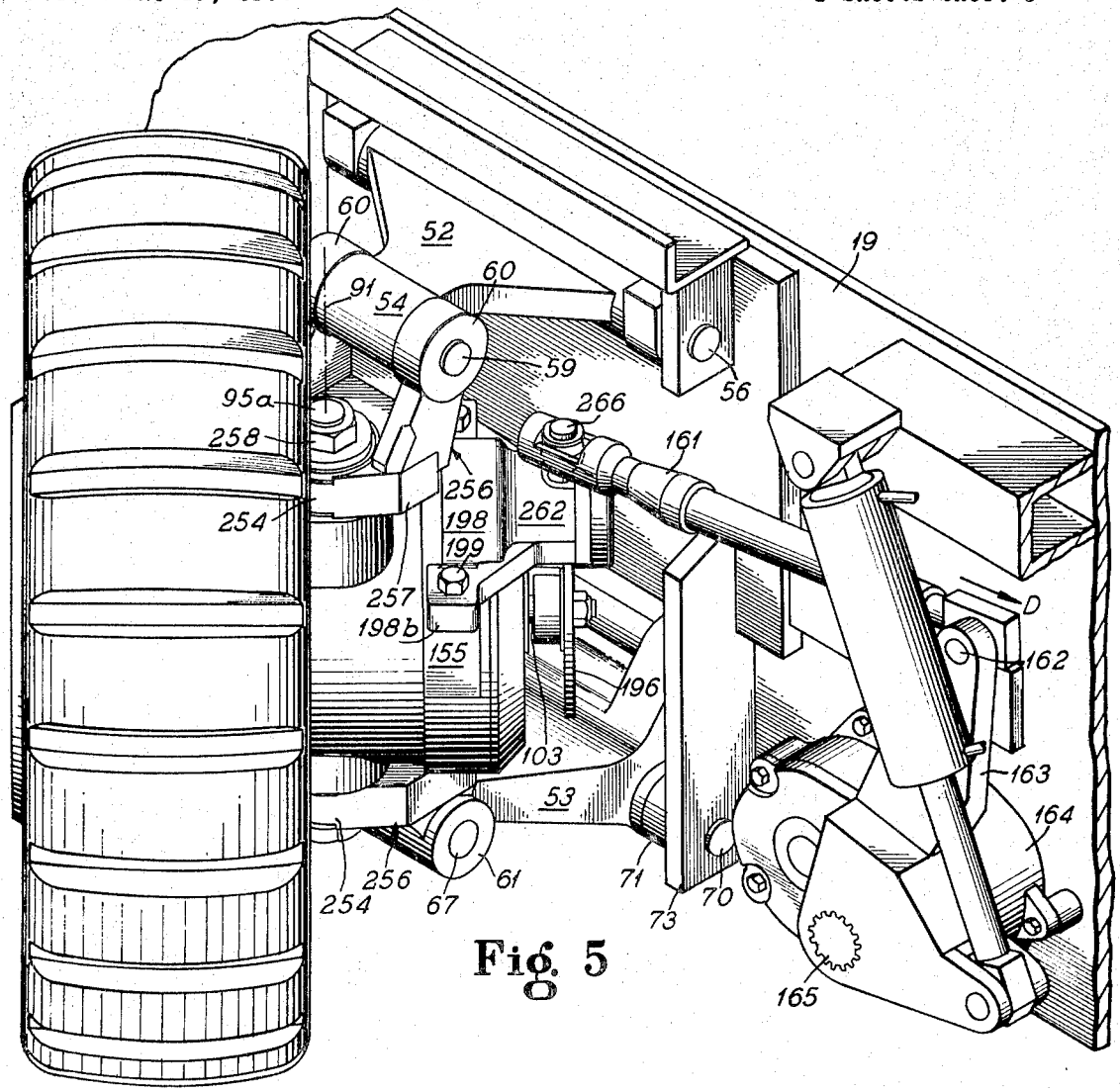
FIG. 5 is an enlarged perspective view of a wheel assembly in the FIG. 1 vehicle, taken generally along line 5—5 in FIG. 1.

The trough-like character of the vehicle is not apparent from the instant drawings, but the vehicle in practice is a trough structure as shown generally in FIG. 5 of Pat. 3,302,739. A bottom wall 21 of the trough underlies a flight conveyor 40 comprised of two endless chains 41 and 42, and interconnecting slats, four of which are shown in FIG. 1 at 43, 44, 45 and 46. During loading or unloading operations the flight conveyor is powered to move in the arrow A direction (FIG. 1) to move coal, etc., into the vehicle trough through its loading end or out of the vehicle trough through its discharge end. The return run of the conveyor goes underneath the bottom wall 21 as shown in FIG. 3.

COAL CAPACITY

FIG. 1 designates the width of the coal-receiving trough by dimension B, and the width of each wheel space by dimension C. In practice dimension B is about 63 inches, and each dimension C is about 23 inches, making a total vehicle width of about 109 inches. It is desirable that dimension C be as small as possible for maximum coal-carrying capacity per given vehicle width. Assuming a nine ton coal capacity, each inch of trough width (dimension B) handles about $\frac{1}{7}$ ton of coal. To the extent we can maintain the 63 inch dimension (or possibly increase it), we can maintain coal capacity while still keeping within the limitations of a given total vehicle width dictated by the prevailing dimensions of passages in the mine.

The present invention aims at keeping coal capacity dimension B as large as possible and each dimension C as small as possible while building brakes into each of the steerable wheels 14, 15, 16 and 17. The need for a brake on each of these four wheels is due to the very heavy inertia forces developed by the vehicle, especially when it is loaded. With a vehicle weight of 25,000 pounds and a nine ton load, the total inertia force at operating speed becomes a very considerable quantity, particularly where downgrades are encountered. Prior vehicles provide individual brakes for only the two center wheels 18 and 18a. The present invention seeks to provide a brake for each of the six illustrated wheels, thereby greatly increasing the effective braking action, and permitting the vehicle to hold itself on steeper inclines and in soft, shifting or muddy surfaces of uneven contour.

Braking effect of a multi-wheel vehicle is the product of wheel reaction times the coefficient of friction which exists between the tire and the passageway surface. The individual wheel reaction of the above six wheel vehicle will be 7,175 pounds. If only two wheels are provided with braking means the braking force will be 14,350 times the coefficient of friction. If all six wheels are provided with braking the braking force will be 43,000 times the coefficient of friction, an improvement of 66 percent over prior vehicles with braking only on two wheels.

FIGS. 3–5

Figure 4:
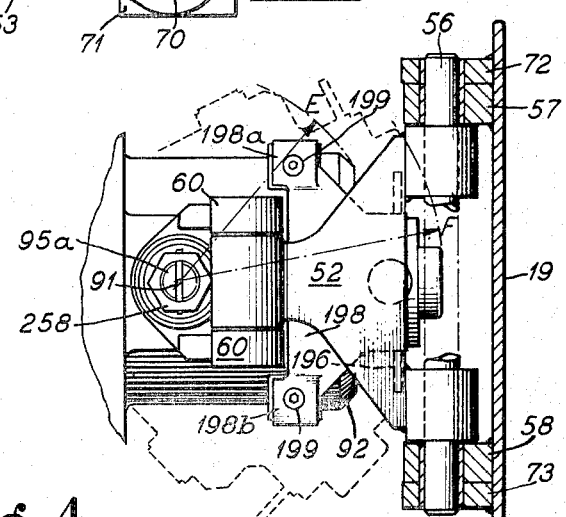
FIG. 4 is a top plan view on a reduced scale of the FIG. 3 mechanism.

FIGS. 3 through 5 illustrate what is believed to be the most practical manner of building a braking system into each of the four steerable wheels 14, 15, 16 and 17. As shown in FIG. 3, a representative wheel assembly comprises a supporting linkage formed by an upper link 52 fulcrumed on a pivot pin 56 going through a pair of support brackets 57 and 58 which are attached to the vehicle side wall 19. A lower link 53 is fulcrumed on a pin 70 that goes through two brackets 71 carried by plate extensions 72 and 73 of wall 19. These plates 72, 73 are merely parts of a rigidifying framework that is built into the vehicle at each wheel area to provide increased strength at these load points.

Positioned in the space between the links 52 and 53 is an electric motor housing 92 that may be essentially identical with the housing shown in FIG. 3 of aforementioned Pat. 3,302,739, except that the instant housing is provided with two axially aligned vertical studs 95a and 96a in lieu of the corresponding pins shown in the patent. Each stud has two encircling flanged sleeves 252 which have rotary fits within the collar portion 254 of a connector member 256. A nut 258 can be tightened on the threaded end of each stud to urge the sleeves 252 toward one another to control the spacing between the sleeve flanges. These flanges are of extensive surface area and constitute thrust bearing surfaces engaging the upper and lower machined faces of collar portion 254. The nut-sleeve arrangement prevents axial play or wobble between the stud and the collar while permitting the stud and collar to have relative rotary motion about the stud axis 91. Should the thrust surfaces wear during service the nut 258 can be tightened to reduce the spacing between the sleeve flanges, thereby maintaining the load-bearing ability of the bearing arrangement.

Each connector 256 is of similar construction, comprising the aforementioned collar 254, flanged main body portion 257, and a pair of lugs 60 or 61 (FIG. 5). The lugs are aligned with the bearing sleeve 54 or 66 of the respective link 52 or 53. Pivot pins 59 and 67 allow pivotal parallelogram movement of the links and connector members 256 about the four pivot axis 56, 59, 67 and 70. Motor 92 is rigidly connected to the two connectors 256 insofar as vertical movement is concerned; the motor and two connectors therefore function as a single link in the parallelogram movement.

WHEEL BRAKING

Motor housing 92, as shown in FIG. 3, contains a rotor-stator assembly that imparts rotary motion to a shaft 103. Shaft 103 in turn drives suitable gearing within the respective wheel (14, 15, 16 or 17) as shown in the aforementioned patent, see particularly the gearing at 110, 120, 131 and 141. The end of shaft 103 adjacent vehicle side wall 19 carries a brake disc 196 which has its peripheral face areas arranged to pass between the brake shoes 201 and 202 carried by the pistons 260 of the dual brake cylinder 200. Suitable hydraulic lines, not shown, apply hydraulic pressure to the rear faces of each piston to force the shoes 201 and 202 against the faces of disk 196 to provide the brake action.

In the illustrated arrangement the brake cylinder comprises a major housing component 262 having a massive collar or base extension 198. As shown in FIGS. 4 and 5, the base includes extensive wing areas 198a and 198b having bolts 199 extending therethrough into lugs or shoulders 155 formed integrally with the end bell portion of motor housing 92. It is particularly desirable that the brake cylinder component 262 have a strong rigid connection with the motor housing because housing component 262 acts as a force connector to effect steering of the individual wheel. As shown in FIGS. 3 and 5, the brake cylinder housing comprises an integral upstanding pin 266 that forms part of a ball-socket connection with a steering control rod or drag link 161. Steering movement is achieved by longitudinal movement of the control rod in the arrow D directions (FIG. 5).

STEERING

A suitable steering control system is described in aforementioned Pat. 3,302,739 and in application Ser. No. 324,770 filed Nov. 19, 1963, now Pat. No. 3,314,690; suffice to say the system may involve rotation of suitable gearing within the gear housing 164 carried by vehicle side wall 19. Such gear movement may be translated into rotary movement of shaft 165 and the attached bell crank 163. The crank transmits steering power to the control rod 161 through a connecting pin 162.

FIGS. 1 and 4 illustrate the limit positions of the steering wheels between their straight-ahead positions and maximum turn positions (clockwise or to the left or right). As there shown, the maximum turning angle is about 45°, around the axis 91 defined by studs 95a and 96a. During the steering operation the motor housing 92 may swing through a considerable arc as shown in FIG. 4. The brake cylinder 262 and the brake disk 196 increase the length of the assembly which must be turned about the stud axis as compared to the length that would be required if the brake were not present. Thus, the turning length with the motor alone is measured by radius line E, whereas the turning length with the brake cylinder attached is measured by radius line F. The increased turning length (dimension F vs. dimension E) presents a clearance problem if the same wheel-vehicle body dimensional relationships are to be maintained as in U.S. Pat. 3,302,739.

The turning axis 91 is in practice about twelve inches from the vehicle side wall 19; to maintain that relation the links 52 and 53 have been increased slightly from the size shown in the aforementioned patent, and the motor carrier or cradle 62 of the patent has been replaced by the two connector members 256 shown in FIG. 3. The effect of these changes is to provide free spaces alongside the motor for accommodating the swinging motions of the motor-brake assembly shown in FIG. 4. The elimination of the cradle 62 necessitates that the motor housing 92 act as the sole rigidifying connection between the two connectors 256; the motor housing acts as a massive kingpin between the two members 256. The motor housing is a cast tubular construction having considerable strength and is therefore able to function in the desired manner.

It will be noted that brake disc 196 has a somewhat smaller diameter than the diameter of disc 196 in U.S. Pat. 3,302,739. The patented brake arrangement was visualized for a non-steerable wheel assembly, and the clearance requirements were not as exacting as with the presently proposed brake applied to a steerable wheel assembly. We have had to reduce the diameter of the brake disk and have slightly reoriented the brake cylinder downwardly to a location directly behind motor housing 92. This new location of the cylinder insures that the cylinder will be accessible and in no danger of striking against link 52 during equalization movements. The equalization operation is described in the aforementioned patent, but suffice to say that during movement of the vehicle over uneven terrain the links 52 and 53 swing in vertical arcs around the respective pins 56 and 70 so that the motor housing 92 and the attached brake cylinder have vertical translational movements, relative to the vehicle body. With the brake cylinder oriented in a location behind the motor there is sufficient vertical clearance during such equalizer movement.

It will be noted that the steering control rod 161 transmits its control force to a pin 266 which is located a considerable distance from the pivot axis 91 of the motor-wheel assembly. This distance, on the order of ten inches, is desirable in minimizing wheel forces transmitted through the steering control rod 161 and thus reducing the loading on pin 266, cylinder housing 262, and bolts 199.

Figure 6:
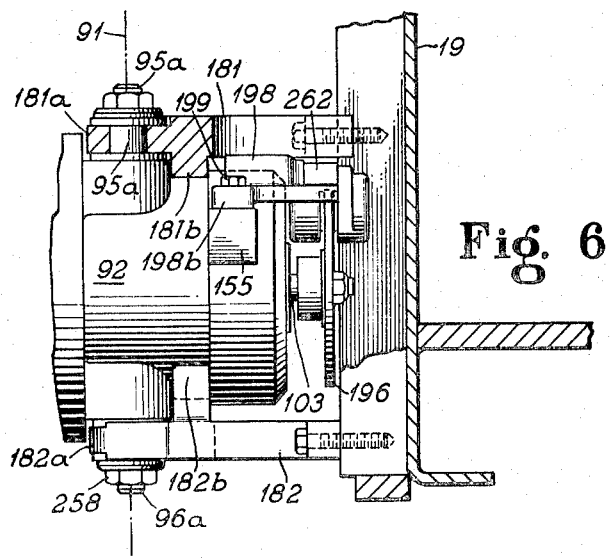
FIG. 6 is a fragmentary sectional view taken on line 6—6 in FIG. 1.

FIG. 6 illustrates the wheel mounting, similar to FIG. 9 of the aforesaid Pat. 3,302,739, for the non-steerable wheel assemblies 18, 18a. The motor housing 92 of non-steerable wheel assemblies is identical to the motor housing of the steerable wheel assemblies and are mounted to the vehicle side wall 19 by means of a pair of upper and lower frame members 181, 182. Frame members 181, 182 are provided with collar portions 181a, 182a similar to the collar portions 254 for the steerable wheels. In addition, upper and lower frame members 181, 182 are each provided with a stop portion 181b, 182b which generally conforms to the surface of the motor housing 92 and effectively lock the housing 92 against any movement about the stud axis 91.

The primary feature of this invention is in the use of motor housing 92 as the sole structural connection between members 256, whereby the side areas alongside the motor are left unencumbered by such cradle structure as might interfere with full steering movement of the assembly between its straight-ahead position and full turn positions. This feature makes possible the accommodation of a brake for each steerable wheel without increasing the vehicle width or reducing the bulk load compartment width.

We claim:
1. A vehicle for mine haulage or the like comprising
   (A) an elongated body having side walls defining an upwardly open trough,
   (B) sets of steerable, drivable, brakeable wheel units mounted at each end of said body with each set comprising a pair of wheel units, one of which is disposed adjacent each of opposite sides of said body,
      (1) each of said wheel units comprising
         (a) a motor enclosed within a housing and having a motor shaft projecting from opposite ends of said housing,
            (1) said motor housing being positioned adjacent a side wall of said vehicle body with said motor shaft horizontally disposed with one end thereof projecting away from said vehicle body and with the opposite end thereof projecting in the direction of said vehicle body,
         (b) means mounting said motor housing on said vehicle body for vertical translational movement and for pivotal movement about a generally vertical axis including an upper and a lower link mounted at vertically spaced locations on said vehicle body,
            (1) each of said links being mounted on said vehicle body adjacent one of its ends for pivotal movement about a generally horizontal axis,
         (c) a connector at the end of each of said upper and lower links opposite said one end attaching said end to the top and bottom walls respectively of said motor housing for pivotal movement of said motor housing about both generally horizontal and generally vertical axes relative to said opposite end of said link,
            (1) said connectors being independent of each other so that said motor housing constitutes the only link between said connectors,
(d) a wheel mounted on said one end of said motor shaft,
(e) a brake disc mounted on said opposite end of said motor shaft,
(f) a brake cylinder mounted on said motor housing and enclosing a pair of brake shoes disposed on opposite sides of said brake disc,
(g) means for moving said brake shoes into contact with said brake disc,
(C) and steering means to effect rotation of each motor housing and consequently each wheel about said generally vertical pivotal axis of said motor housing,
(1) said steering means including an elongated steering link connected at one of its ends to said motor housing in spaced relation to said vertical pivotal axis thereof and being connected at its opposite end to a steering control means on said vehicle body capable of effecting selectively controlled axial movement of said steering link.

2. A vehicle in accordance with claim 1, wherein a pivot stud projects from each of the upper and lower wall of said housing and is rigidly affixed thereto, wherein said studs together define a generally vertical pivotal axis for said motor housing, wherein one of said connectors is attached to each of said studs in encircling relation thereto for relative pivotal movement between said connector and said motor housing about said generally vertical pivotal axis, and wherein each of said connectors is connected to said opposite end of one of said links for relative pivotal movement between said connector and said link about a generally horizontal axis.

3. A vehicle in accordance with claim 2, wherein each of said connectors includes an opening to receive one of said studs, and wherein a pair of sleeves having outwardly extending flanges encircle each of said studs within said connector opening with the flange of each sleeve adjacent an outer surface of said connector to capture said connector intermediate said flanges, and wherein means are provided to secure said sleeves in encircling relation to said studs.

4. A vehicle in accordance with claim 1, wherein said brake disc is mounted on said opposite end of said motor shaft in spaced relation to the adjacent end of said motor housing, and wherein one of said brake shoes is disposed intermediate said brake disc and the adjacent end wall of said motor housing and the other of said brake shoes is disposed directly opposite said one brake shoe adjacent the opposite face of said brake disc.

5. A vehicle for mine haulage or the like comprising, an elongated body having side walls defining an upwardly open trough, sets of steerable, drivable, brakeable wheel units mounted at each end of said body with each set comprising a pair of wheel units one of which is disposed adjacent each of opposite sides of said body, each of said wheel units comprising a motor enclosed within a housing and having a motor shaft projecting from opposite ends of said housing, said motor housing being positioned adjacent a side wall of said vehicle body with said motor shaft horizontally disposed with one end thereof projecting away from said vehicle body and with the opposite end thereof projecting in the direction of said vehicle body, means mounting said motor housing on said vehicle body for vertical translational movement and for pivotal movement about a generally vertical axis including an upper and a lower link mounted at vertically spaced locations on said vehicle body, each of said links being mounted on said vehicle body adjacent one of its ends for pivotal movement about a generally horizontal axis, a connector at the end of each of said upper and lower links opposite said one end attaching said end to the top and bottom walls respectively of said motor housing for pivotal movement of said motor housing about both generally horizontal and generally vertical axes relative to said opposite end of said link, said connectors being independent of each other so that said motor housing constitutes the only link between said connectors, a wheel mounted on said one end of said motor shaft, a brake disc mounted on said opposite end of said motor shaft, a brake cylinder mounted on said motor housing in spaced relation to said generally vertical pivotal axis thereof and enclosing a pair of brake shoes disposed on opposite sides of said brake disc, means for moving said brake shoes into contact with said brake disc, and steering means to effect rotation of each motor housing and consequently each wheel about said generally vertical pivotal axis of said motor housing, said steering means including an elongated steering link connected to said brake cylinder in spaced relation to said vertical pivotal axis of said motor housing by means permitting pivotal movement of said motor housing relative to said steering link about an axis normal to the longitudinal axis of said steering link as well as about the longitudinal axis of said steering link, said steering link being connected at its opposite end to a steering control means on said vehicle body capable of effecting selectively controlled axial movement of said steering link.

References Cited

UNITED STATES PATENTS

| | | | |
|---|---|---|---|
| 866,410 | 9/1907 | Walker | 180—43 B |
| 2,430,528 | 11/1947 | Moon | 180—43 X |
| 3,035,652 | 5/1962 | McLean | 180—60 X |
| 3,161,172 | 12/1964 | Kassbohrer | 180—24 X |
| 3,280,933 | 10/1966 | Jones | 180—52 |
| 3,302,739 | 2/1967 | Beck et al. | 180—24 |
| 3,605,931 | 9/1971 | Firth et al. | 180—43 R |
| 3,612,204 | 10/1971 | Allen | 180—43 R |

FOREIGN PATENTS

| | | | |
|---|---|---|---|
| 1,806,022 | 5/1970 | Germany | 180—66 F |

KENNETH H. BETTS, Primary Examiner

U.S. Cl. X.R.

180—43 R